Figure 1:
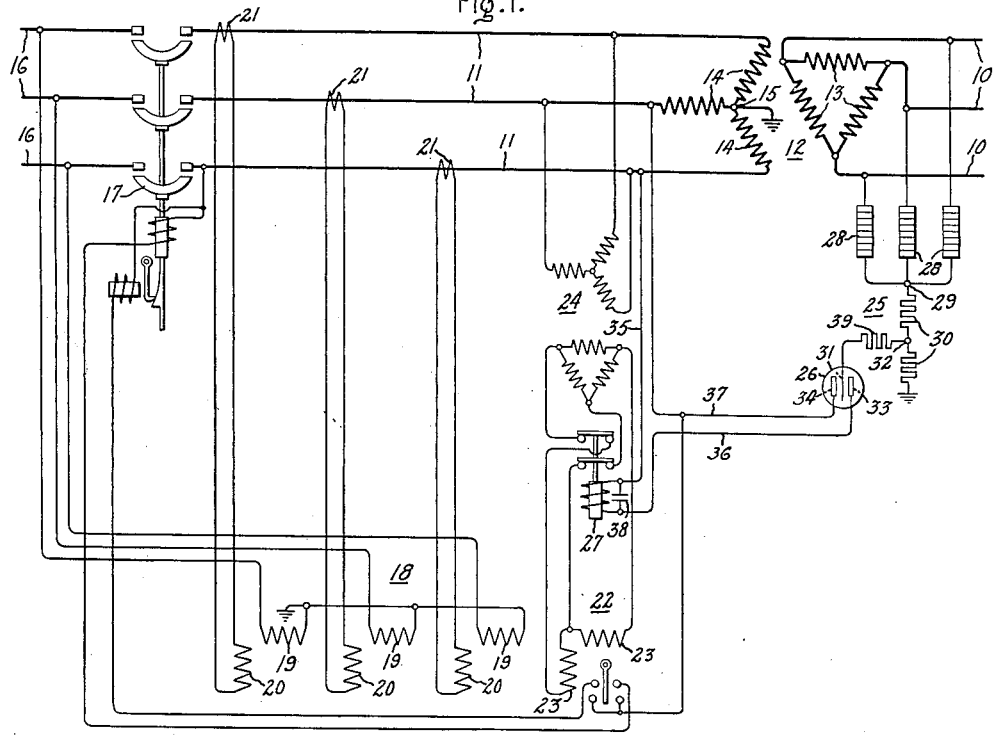

Inventor:
Frank M. Starr,
by Harry E. Dunham
His Attorney.

Jan. 7, 1936.  F. M. STARR  2,027,209
CONTROL AND PROTECTION OF ELECTRIC CIRCUITS
Original Filed March 29, 1934   2 Sheets-Sheet 2

Inventor:
Frank M. Starr,
by Harry E. Dunham
His Attorney.

Patented Jan. 7, 1936

2,027,209

UNITED STATES PATENT OFFICE 2,027,209

CONTROL AND PROTECTION OF ELECTRIC CIRCUITS

Frank M. Starr, Schenectady, N. Y., assignor to General Electric Company, a corporation of New York Application March 29, 1934, Serial No. 717,978
Renewed February 9, 1935

15 Claims. (Cl. 175—294)

My invention relates to improvements in the control and protection of electric circuits and more particularly to improvements in the control and protection of alternating current network distribution systems and an object of my invention is to provide a control and protective arrangement which is in general an improvement on arrangements heretofore known to the art.

In network distribution systems, one or more feeders are connected to the network through step-down transformers and network protectors. Energy directional responsive devices are usually associated with the protectors so as to disconnect the network from the feeder when for any reason, such as a fault on the feeder, power flow is from the network to the feeder. In order to isolate feeders for inspection and maintenance and incidentally to save losses, these energy directional responsive devices have been given a sensitivity of response such as to disconnect the network from the feeder merely on the reverse flow of power due to the magnetizing current of the transformer in a feeder out of service, that is, disconnected at the power station. This degree of sensitivity frequently results in unnecessary interruptions due to feed back from regenerating elevator motors or to circulating currents arising from slight differences in feeder voltages. In order to avoid such undesired operations, the energy directional means was desensitized or restrained in some manner usually in dependence on the network voltage. But this sacrificed the desired feeder isolation control and also the tripping on reverse magnetizing current. While these features are desirable, expensive potential devices for obtaining them must not increase the hazard of the system or reduce its economies of operation. Also it is customary to apply a high voltage D. C. test frequently to the feeders and connected equipment. Accordingly, any means provided to give the desired control and sensitivity should be able to withstand such high voltage tests without damage or change in characteristic and also, in the event of systems with a large number of feeders, not overload the testing means employed. Further it is desirable to be able automatically to disconnect the network from the feeder by a simple operation performed at the station.

An object of my invention is to provide an improved control and protective arrangement for providing non-sensitive protection under normal operating conditions and yet obtaining a more sensitive operation whenever a ground occurs on the feeder whether the ground is accidental as a fault or purposely applied in order to disconnect the feeder from the network. Another object of my invention is to provide such an improved arrangement as will not be affected by and will not interfere with the high voltage direct current tests which are applied to network systems of the type in question. A further object of my invention is to provide an improved voltage-responsive device for detecting the presence of grounds on an electric circuit. These and other objects of my invention will appear in more detail hereinafter.

My invention is in part an improvement upon the control and protective arrangements disclosed in the copending applications of Hudson R. Searing, Serial No. 732,049, filed June 23, 1934, and Willard J. McLachlan, Serial No. 717,218, filed March 24, 1934, for Control and protection of electric circuits, both assigned to the same assignee as this invention. These applications contain claims dominating my subsequently made invention.

My invention will be better understood from the following description when considered in connection with the accompanying drawings and its scope will be pointed out in the appended claims.

In the accompanying drawings, Fig. 1 illustrates diagrammatically an embodiment of my invention as applied to the control and protection of a network system; Figs. 2, 3, 4 and 5 diagrammatically illustrate modifications of my invention and Fig. 6 diagrammatically illustrates another application of my invention.

In Fig. 1 of the accompanying drawings, I have shown, for the purpose of illustrating my invention, an embodiment thereof as applied to the control and protection of an electric system comprising two electric circuits 10 and 11. As illustrated, these are three-phase circuits which are inductively coupled by a transformer 12 having windings 13 delta-connected to the circuit 10 and windings 14 Y-connected to the circuit 11 with the neutral point 15 grounded. The circuit 10 may represent one of a plurality of feeder circuits which are arranged to supply a network indicated schematically by the conductors 16. The network is connected to the respective feeders through suitable circuit interrupting means 17. The feeders 10 usually extend from one or more power stations, not shown, which may be provided with grounded neutrals. Each feeder generally is provided with fault responsive protective means for opening the feeder at the power station on the occurrence of abnormal conditions on the feeder. At the power station the feeder may be provided with means for grounding one or more of the feeder conductors after the station feeder circuit breaker has opened as disclosed for example in British Patent 396,853. Likewise, as disclosed in United States Letters Patent 1,883,839, issued October 18, 1932, there may be provided energy directional responsive means such as a polyphase power directional relay 18 which is responsive to the exchange of energy between the network and the feeder to effect the opening of the circuit breaker 17 when energy flow is from the network to the feeder. This relay comprises voltage windings 19 which are connected to be energized from the network side of the circuit breaker 17 and cooperating current windings 20 which are connected to be energized from current transformers 21 on the feeder side of the circuit breaker 17. Also, as disclosed in the said United States Letters Patent, the relay 18 may be provided with a restraining or desensitizing means 22 which is simply illustrated as two voltage windings 23. These are connected to be energized by the potential transformer 24 and to exert a restraining torque tending to prevent movement of the relay to the tripping position.

In accordance with my invention, I provide means responsive to a ground on the circuit 10, whether the ground is accidental, as a ground fault, or is purposely applied at the power station after disconnection of the circuit 10 therefrom. As shown in Fig. 1, this ground responsive means is so arranged as to control the sensitivity of response of the directional relay 18 although it may be used for other control or protective purposes as will appear hereinafter. Also as shown in Fig. 1, this ground responsive means includes a coupling unit 25 which is connected between the phase conductors of the circuit 10 and ground and which is operative to control the conductivity of an electric discharge valve 26. This, when rendered conductive, may effect the operation of any desired device such as an auxiliary relay 27 which, as shown, is arranged to control the sensitivity of the directional relay 18.

The coupling unit 25 may take many forms. That shown in Fig. 1 comprises two or more impedance devices 28 which are respectively connected at one end to the phase conductors of the circuit 10 and which have their other end connected to a common point 29. These devices 28 are such that they are under normal conditions virtually insulators and they preferably have an inverse potential-resistance characteristic without time lag. Such devices are disclosed, for example, in United States Letters Patent 1,822,742, issued September 8, 1931. Their characteristic may be expressed by the equation $I = KE^n$, I and E representing respectively the current in and the voltage across the resistance, K being a constant and $n$ a number greater than 1. A similar characteristic can be obtained by a gap in series with a constant resistance. From the common point 29 of the resistance devices 28 there may be connected to ground, in order to render the valve 26 conductive in case of a ground on the circuit 10, a substantially constant resistance 30 whose ohmic value may be relatively small in comparison with that of the devices 28. The ohmic value of the resistance 30 should be large enough to prevent an undesired amount of current flow in case of a ground on the circuit 10 and under the application of high voltage tests.

For convenience, simplicity and economy the valve 26 may be of the cold cathode glow discharge type having a control electrode 31 which is connected to a point 32 on the resistance 30 sufficiently above ground potential on the occurrence of a ground on the circuit 10 to render the valve 26 conductive. The discharge electrodes 33, 34 of the valve 26 may be connected in a control circuit with the auxiliary relay 27 and any suitable source either direct current or alternating current. For example, this control circuit may be energized in accordance with the voltage between the two lower phase conductors of the circuit 11. As shown, the circuit is bottom phase conductor of the circuit 11, the conductor 35, the winding of the auxiliary relay 27, the conductor 36, the discharge electrodes 33 and 34 of the valve 26, the conductor 37 and the middle phase conductor of the circuit 11. Inasmuch as the discharge of the valve 26 is of an intermittent oscillatory character when an alternating voltage is applied to the grid 31, a smoothing condenser 38 may be connected across the auxiliary relay 27 to keep it picked up after the first discharge impulse.

Figure 2:
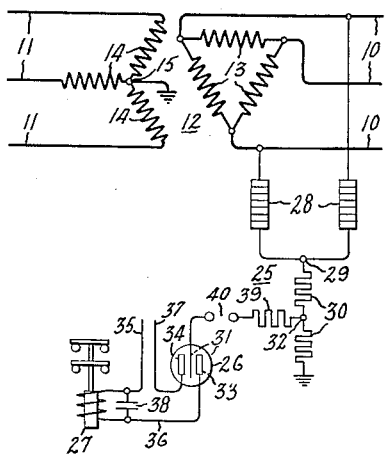

I have found that there is considerable latitude in the phase relation between the voltage on the control electrode 31 and that across the discharge electrodes 33, 34 to provide satisfactory operation and since in case of a ground on the circuit 10, both of the ungrounded conductors go from Y to delta voltage above ground, only two resistance devices 28 are necessary in a three-phase circuit, as shown in Fig. 2, unless selective phase operation is desired as will be discussed in more detail in connection with Fig. 6. Also where my invention is to be applied to circuits which may be subjected to high voltage D. C. potential tests it is desirable particularly if many ground responsive devices are to be employed that suitable current limiting means such as a resistance 39 be inserted in the grid control circuit of the valve 26.

Whenever a ground occurs on the circuit 10, the voltages to ground of the ungrounded conductors thereof increase to such a value, that the resistance devices 28 associated with these conductors have their resistances so decreased that there is enough current flow in the resistance 30 to provide a voltage on the control electrode 31 of the valve 26 sufficient to render the valve conductive. Current is thereby enabled to flow in the circuit of the auxiliary relay 27 which, when energized, opens its contacts in the circuits of the voltage windings 23 of the restraining means 22 whereby to remove the restraint.

Assuming, for example, a ground on the circuit 10, the protective means at the power station operates to disconnect the feeder at the station. The voltage to ground on the ungrounded conductors of the feeder 10 rises from Y voltage to delta voltage because the feeder is still energized from the network. With the resultant increase in voltage, the resistance devices 28 associated with the ungrounded conductors have their resistances materially decreased so that they pass an appreciable amount of current. Accordingly, the resultant voltage drop to ground from the point 32 on the resistance 30 to which the control electrode 31 is connected becomes sufficient to render the valve 26 conductive. The circuit of the auxiliary relay 27 is energized as previously pointed out and this relay operates to remove the restraint from the directional relay 18. Consequently, regardless of the severity of the ground fault, the directional relay 18 operates to effect tripping of the circuit breaker 17 because the exchange of energy is now from the network to the feeder.

If it is desired to isolate a feeder from the network at any time, the circuit of the feeder may be opened at the power station and then one of the feeder conductors grounded. As soon as this is done, the voltages on the resistance devices 28 associated with the ungrounded conductors increase sufficiently to render these devices so conductive as to produce a voltage drop in the resistance 30 to render the valve 26 conductive. The auxiliary relay 27 is accordingly energized and operates so to sensitize the directional relay 18 as to insure the tripping of the circuit breaker 17 on the flow of transformer magnetizing current from the network to the feeder.

For increased selectivity in operation, that is to say closer discrimination between grounded and ungrounded conductors of the circuit 10, I may provide a gap discharge or breakdown device 40 in circuit with the control electrode 31, as shown in Fig. 2. The operation will be substantially the same as the grounding means shown in Fig. 1 except for the more definite breakdown voltage provided by a gap.

Figure 3:
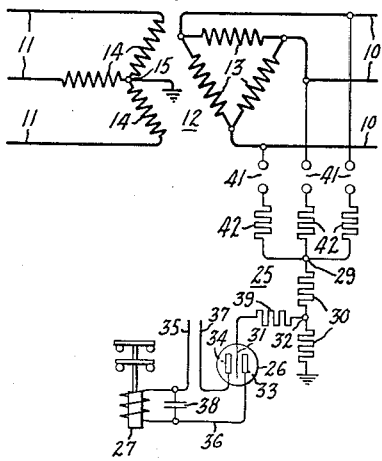

In place of resistance devices 28 of the type illustrated in connection with the arrangement shown in Fig. 1, I may provide a gap 41 and a substantially constant resistance 42, as shown in Fig. 3 to insure similar operating characteristics. Thus, on the occurrence of a ground on one of the feeder conductors 10 the voltage of the other two conductors to ground increases and as the gaps 41 associated with these conductors arc over the impedance of these gaps suddenly drops from an infinite value to some relatively finite value. The operation will be obvious from the description heretofore given in connection with Fig. 1.

Figure 4:
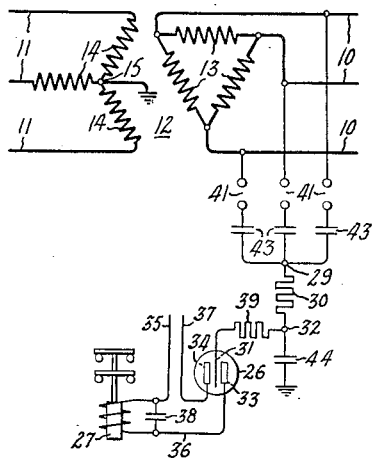

In place of the resistances 42 shown in Fig. 3, I may, as shown in Fig. 4, use condensers 43 and also obtain the potential on the control electrode 31 from a condenser 44. Again the operation is analogous to that of the arrangements previously described.

Figure 5:
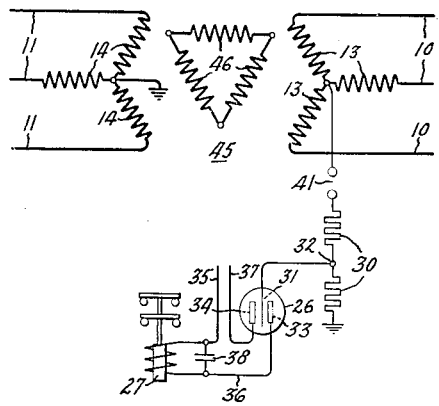
Figure 6:
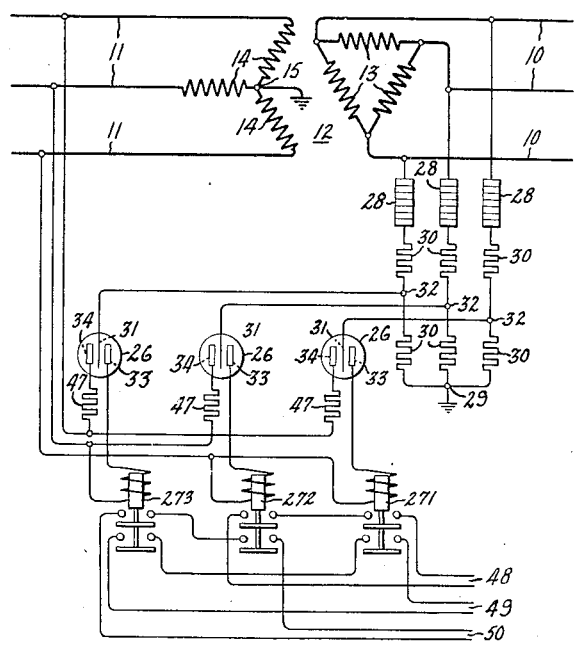

When it is desired to use a transformer with windings Y connected to both the feeder 10 and the network 11, I may provide an arrangement such as is shown in Fig. 5, the transformer 45 being provided with delta connected tertiary windings 46. In this case the coupling unit is connected between the neutral of the windings 13 and ground so that normally there is substantially no voltage across it. Here again the coupling unit may include a gap 41 and a substantially constant resistance 30 or any one of the units shown, connected between a single phase conductor and ground of Figs. 1–4 inclusive. The operation will be obvious from what has preceded since it will be clear that a ground on the circuit 10 will render the valve 26 conductive and thereby effect operation of the relay 27 as heretofore pointed out.

In the embodiment of my invention shown in Fig. 6, I have illustrated an arrangement whereby, dependent on which conductor of the circuit 10 is grounded, a discriminating action may be obtained. In this arrangement the coupling unit may, in general, consist of the devices heretofore described, the essential difference being that the junction point 29 of the non-linear characteristic resistances 28 is moved down to include also the constant resistances 30. Also a plurality of valves 26 is provided, one for each phase conductor of the circuit in this arrangement. Here again the control electrodes 31 of the valves are connected to a point on the resistance 30 sufficiently above ground potential to provide the necessary voltage to render the valves conductive when the voltage on any phase conductor of the circuit 10 goes from Y voltage to delta voltage. The discharge electrodes 33 and 34 of the valves 26 may be connected in circuits across the different phases of the circuit 11 respectively as shown and include the electroresponsive devices 271, 272, 273 which are to be operated, as well as current limiting devices 47 which may be used to limit the current in these circuits. As shown, the electroresponsive devices 271, 272 and 273 are each provided with two sets of contacts which are so arranged that two of the relays must operate to complete a circuit. For example, when the relays 271 and 272 operate, they control a circuit 48, when relays 271 and 273 operate they control a circuit 49 and when the relays 272 and 273 operate they control a circuit 50. Each of these circuits may include any device to be operated such, for example, as an alarm, indicating or other device, as will be obvious to those skilled in the art, although an indication could be obtained directly from the two relays which operated.

Assuming a ground on a phase conductor of the circuit 10, for example the lower phase conductor, then the voltage to ground of each of the other phase conductors will go from Y voltage to delta voltage. In consequence of this the voltage on the lower portion of the resistances 30 associated with these conductors will rise sufficiently to render conductive the valves 26 associated with these conductors. Accordingly the circuits of the electroresponsive devices 271 and 272 will be energized to close their contacts and thereby control the circuit 48. By analogy it will be obvious that a ground on the middle phase conductor of the circuit 10 will effect the operation of the relays 271 and 273 whereby to control the circuit 49 and a ground on the top phase conductor of the circuit 10 will effect the operation of the relays 272 and 273 whereby to effect the control of the circuit 50.

While I have shown and described my invention in considerable detail, I do not desire to be limited to the exact arrangements shown but seek to cover by the appended claims all those changes and modifications which fall within the true spirit and scope of my invention.

What I claim as new and desire to secure by Letters Patent of the United States, is:

1. In combination, an alternating current electric circuit of the type wherein a ground on one conductor results in an increase in voltage between another conductor and ground, a normally non-conductive electric discharge valve having control and discharge electrodes, means for impressing an operating circuit voltage on said discharge electrodes insufficient to render said valve conductive, means for rendering said valve conductive when the voltage to ground of said other conductor of the circuit exceeds a predetermined value including an inverse potential impedance characteristic device and a substantially constant resistance device connected in series relation between said circuit and ground, the control electrode of said valve being connected to one of said resistance devices at a point thereof above ground potential.

2. In combination, a three-phase electric circuit of the type wherein a ground on one phase conductor of the circuit causes the voltage to ground of the other phase conductors to increase from Y voltage to delta voltage, an electric discharge valve having a control electrode and two discharge electrodes, a device to be operated on the occurrence of said voltage increase, a circuit including said device and said discharge electrodes, a source of electromotive force for energizing said device circuit and means for rendering said valve conductive on the occurrence of a ground on said power circuit including a voltage drop coupling means between the power circuit and ground, said control electrode being connected to be energized in accordance with a voltage derived from said coupling means and normally insufficient to render the valve conductive.

3. In combination, two electric circuits arranged for exchange of energy, means responsive to the direction of energy exchange for interrupting one of said circuits, voltage drop coupling means having an inverse potential-impedance characteristic connected between one of said circuits and ground, electric discharge valve means connected to be controlled in accordance with a voltage derived from said coupling means to become conductive on the occurrence of a ground on the circuit to which the coupling means is connected and means for varying the sensitivity of said directional responsive means when said valve means becomes conductive.

4. In combination, two polyphase alternating current electric circuits arranged for exchange of energy, means responsive to the direction of energy exchange for interrupting one of said circuits, coupling means between said other circuit and ground, said coupling means including a plurality of resistances having an inverse potential-resistance characteristic and respectively connected to a plurality of the phase conductors of said other circuit, electric discharge valve means connected to be controlled in accordance with a voltage derived from said coupling means to become conductive on the occurrence of a ground on said other circuit, and means for varying the sensitivity of said directional responsive means when said valve becomes conductive.

5. In combination, an electric circuit, a normally non-conductive electric discharge valve having control and discharge electrodes, means for impressing an operating circuit voltage on said discharge electrode insufficient to render said valve conductive and means for rendering said valve conductive when the voltage to ground of a conductor of the circuit exceeds a predetermined value including a resistance having the characteristic $I=KE^n$, I and E representing respectively the current in and the voltage across the resistance, K being a constant and $n$ a number greater than 1 and a substantially constant resistance connected in series relation between said circuit and ground, the control electrode of said valve being connected to a point of said constant resistance at a point thereof above ground potential.

6. In combination, an electric discharge valve having a control electrode and two discharge electrodes, a device to be controlled, a circuit including said device and said discharge electrodes, a source of electromotive force for energizing said circuit and coupling means between said circuit and ground for rendering said valve conductive on the occurrence of a ground on the circuit including an inverse potential-impedance characteristic device, said control electrode being connected to be energized in accordance with a voltage derived from said coupling means and normally insufficient to render the valve conductive.

7. In combination, a three-phase feeder circuit, a three-phase network circuit, a transformer having windings delta-connected to the feeder circuit and windings Y-connected to the network circuit, means responsive to the direction of energy exchange between said circuits for interrupting the network circuit, a coupling unit including at least two variable resistances having the characteristic $I=KE^n$, I and E representing respectively the current in and the voltage across the resistance, K being a constant and $n$ a number greater than 1 respectively connected at one end to two phase conductors of the feeder circuit and having their other ends joined and a substantially constant resistance connecting the other end of said variable resistances to ground, a normally non-conductive electric discharge valve having two discharge electrodes and a control electrode the latter being connected to a point of said constant resistance above ground potential and means for impressing across said discharge electrodes a voltage derived from the network circuit and insufficient to render the valve conductive and means connected in circuit with said discharge electrodes for increasing the sensitivity of said energy directional responsive means when said valve becomes conductive.

8. A ground responsive device for a three-phase circuit including two inverse potential-impedance characteristic devices respectively connected at one end to different phase conductors of the circuit and having the other ends connected to ground through a common connection whereby a ground on a conductor of the circuit causes current flow in said connection and means controlled by the current flowing in said connection.

9. A ground responsive device for a three-phase circuit including two inverse potential-impedance characteristic devices respectively connected at one end to different phase conductors of said circuit and having their other ends connected to ground through a common connection whereby a ground on a conductor of the circuit causes current to flow in said common connection, an impedance device in said common connection and means connected to be energized in accordance with a voltage derived from said impedance device.

10. A ground responsive device for a three-phase circuit including two inverse potential impedance characteristic devices respectively connected at one end to different phase conductors of said circuit and having the other ends connected to ground through a common connection whereby a ground on a conductor of said circuit causes current to flow in said common connection, an impedance device in said common connection and a normally non-conductive electric discharge valve connected to have its conductivity controlled in accordance with a voltage derived from said impedance device.

11. In combination, an alternating current electric circuit of the type wherein a ground on one conductor results in an increase in voltage between another conductor and ground, a normally non-conductive electric discharge valve having control and discharge electrodes, means for impressing an operating circuit voltage on said discharge electrodes insufficient to render said valve conductive, coupling means for rendering said valve conductive when the voltage to ground of said other conductor of the circuit exceeds a predetermined value including an inverse potential-resistance characteristic device and means for energizing the control electrode of said valve in accordance with a voltage derived from said coupling means to render the valve conductive on the occurrence of a ground on the circuit.

12. In combination, a three-phase feeder circuit, a three-phase network, a transformer having windings delta-connected to the feeder circuit and windings Y-connected to the network, means responsive to the direction of energy exchange between said circuits for disconnecting the network from the transformer, a coupling unit including at least two inverse potential-impedance characteristic devices respectively connected at one end to two phase conductors of the feeder circuit, a connection between the other end of said inverse potential-impedance characteristic devices and ground, a normally non-conductive electric discharge valve having two discharge electrodes and a control electrode the latter being connected to be energized in accordance with the current flowing in said connection, means for impressing a voltage across said discharge electrodes normally insufficient to render the valve conductive and means connected in circuit with said discharge electrodes for controlling the sensitivity of said energy directional responsive means when said valve becomes conductive.

13. In combination, a three-phase feeder circuit, a three-phase network, a transformer having windings delta connected to the feeder circuit and windings Y connected to the network, means responsive to the direction of energy exchange between said circuits for disconnecting the network from the transformer, a coupling unit including at least two inverse potential-resistance characteristic devices respectively connected at one end to two phase conductors of the feeder circuit, a substantially constant resistance device connecting the other end of said inverse potential-resistance characteristic devices to ground, a normally non-conductive electric discharge valve having two discharge electrodes and a control electrode the latter being connected to an intermediate point of said constant resistance device, means for impressing across said discharge electrodes a voltage derived from the circuit and insufficient to render the valve conductive, and means connected in circuit with said discharge electrodes for increasing the sensitivity of said energy directional responsive means when said valve becomes conductive.

14. In combination, an alternating current electric circuit of the type wherein a ground on one conductor results in an increase in voltage between the other conductors and ground, and means selectively operable in dependence on which of the conductors is grounded including a plurality of normally non-conductive electric discharge valves respectively associated with a plurality of the circuit conductors, means for rendering a valve conductive when the voltage to ground of the conductor associated therewith exceeds a predetermined value, and means selectively controlled in dependence on the valves rendered conductive.

15. In combination, an alternating current electric circuit of the type wherein a ground on one conductor results in an increase in voltage between the other conductors and ground, means selectively operable in dependence on which of the circuit conductors is grounded including a plurality of normally non-conductive electric discharge valves respectively associated with a plurality of the circuit conductors, means for impressing a voltage on the discharge electrodes of said valves insufficient to render them conductive, means for rendering a valve conductive when the voltage to ground of the circuit conductor associated therewith exceeds a predetermined value including an inverse potential impedance characteristic device and a substantially constant resistance device connected in series relation between each of a plurality of circuit conductors and ground, the control electrodes of said valves being respectively connected to the resistance device associated with the different conductors at a point on the resistance device above ground potential, and means selectively controlled in dependence on the valves rendered conductive.

FRANK M. STARR.